United States Patent [19]

Stephens

[11] Patent Number: 5,734,254
[45] Date of Patent: Mar. 31, 1998

[54] BATTERY PACK AND CHARGING SYSTEM FOR A PORTABLE ELECTRONIC DEVICE

[75] Inventor: Charles S. Stephens, Corvallis, Oreg.

[73] Assignee: Hewlett-Packard Company, Palo Alto, Calif.

[21] Appl. No.: 759,693

[22] Filed: Dec. 6, 1996

[51] Int. Cl.$^6$ ............................................. H01M 10/46
[52] U.S. Cl. ............................................ 320/106; D13/107
[58] Field of Search ........................... 320/2, 48; 429/90, 429/96, 97, 98, 99, 100; D13/107

[56] References Cited

U.S. PATENT DOCUMENTS

| | | | |
|---|---|---|---|
| 4,873,677 | 10/1989 | Sakamoto et al. | 320/2 X |
| 4,942,352 | 7/1990 | Sano | 320/2 |
| 4,998,055 | 3/1991 | Nash et al. | 320/2 |
| 5,200,685 | 4/1993 | Sakamoto | 320/2 |
| 5,206,097 | 4/1993 | Burns et al. | 429/90 |
| 5,327,067 | 7/1994 | Scholder | 320/2 |
| 5,367,242 | 11/1994 | Hulman | 320/2 |
| 5,455,466 | 10/1995 | Parks et al. | 307/104 |
| 5,483,437 | 1/1996 | Tang | 363/146 |
| 5,600,225 | 2/1997 | Goto | 320/2 |

Primary Examiner—Edward Tso

[57] ABSTRACT

A battery pack, adapter and integrated charging system for charging a battery pack of the type used in a portable electronic device such as a notebook computer, a cellular telephone, etc. The battery pack includes a battery coupled through a power converter to a secondary transformer winding. A communication link is provided to the adapter which includes control logic and a power selector. The adapter may be configured to provide DC or AC power to charge a portable electronic device and the processor of a portable electronic device may be used to control charging of an external battery pack.

12 Claims, 3 Drawing Sheets

BATTERY PACK AND CHARGING SYSTEM FOR A PORTABLE ELECTRONIC DEVICE

FIELD OF THE INVENTION

The present invention relates to battery packs, AC adapters and charging systems for use with portable electronic devices, such as computers, cellular telephones, etc.

BACKGROUND OF THE INVENTION

The prior art teaches various systems for charging a battery pack for use in a portable computing device. One such prior art system includes a wall adapter unit connected by a cord to a battery charger. The battery charger contains one or more vertical slots in a top surface thereof in which battery packs are inserted for charging. Charging is achieved through direct electrical contact to external electrodes. A disadvantage of this design is that as new batteries are developed for new or different portable computing devices, new battery chargers having slots that conform to the shape and electrode arrangement of the new batteries must be developed.

The prior art also includes a system for providing wireless powering of a laptop computer. This system, disclosed in U.S. Pat. No. 5,455,466, issued to Parks et al, includes a desk top computer that controls a power amplifier used to inductively couple power to a portable computer. Disadvantages of this system include the complexity and size of the computers used to control the inductive transfer of power and that the system does not provide simultaneous charging of a battery pack and separate portable computing device.

Other relevant aspects of the prior art include that the prior art does not disclose battery packs having charge control logic provided exterior to the battery pack (i.e., in the charger) to thereby reduce weight, cost and size of the battery pack.

SUMMARY OF THE INVENTION

Accordingly it is an object of the present invention to provide a battery and corresponding charger that permits a battery of any size and voltage to be charged by the charger.

It is another object of the present invention to provide a battery charger that can simultaneously charge both a battery and power a portable electronic device.

It is also an object of the present invention to provide a battery charging unit that can simultaneously charge batteries of varying size and power a portable electronic device.

These and related objects of the present invention are achieved by use of battery pack, adapter and charging systems disclosed herein.

In one embodiment of the present invention, a battery pack is disclosed that comprises a battery mounted within a housing and coupled through a power converter to a secondary transformer winding. A communication port formed in an exterior of said housing permits propagation of battery status signals outside of the housing. The communication port may be implemented using infrared technology and a proximity indicating device may be provided to indicate the presence of the battery pack to a charger. Feedback control logic controls an output of the power converter based on sensed battery status signals.

In another embodiment of the present invention, an AC adapter is disclosed that comprises a primary transformer winding mounted within a housing for emitting an AC power signal outside of said housing, a power selector coupled between the primary transformer winding and an AC input for selecting a level of power emitted from the primary transformer winding, a communication port for receiving propagated battery status signals from a battery pack within the proximity of said adapter, and control logic coupled to the communication port for generating control signals controlling the charging of a battery pack in the proximity of the adapter. The adapter may be configured such that the control signals control the level of an AC power signal output from the power selector or an output of a power converter in the battery pack (in this instance the control signals are propagated through the wireless communication port to the battery pack), or both. The adapter may also provide a proximity detector for detecting when a battery pack is proximate the adapter and an AC/DC converter to produce a DC power signal. The adapter may also be provided with a second power selector and primary transformer winding for inductively charging another battery pack or portable electronic device.

In yet another embodiment of the present invention, a charging system is disclosed including a battery pack containing a battery, an adapter, a portable electronic device separate from the battery pack, and a communication link between the battery pack and the portable electronic device for propagating battery status information to the portable electronic device. The adapter may be configured to simultaneously charge a first battery pack and a second battery pack/portable electronic device. The communication link is preferably IR.

The attainment of the foregoing and related advantages, features and configurations of the present invention should be more readily apparent to those skilled in the art, after review of the following more detailed description of the invention taken together with the drawings.

DETAILED DESCRIPTION

Figure 1:
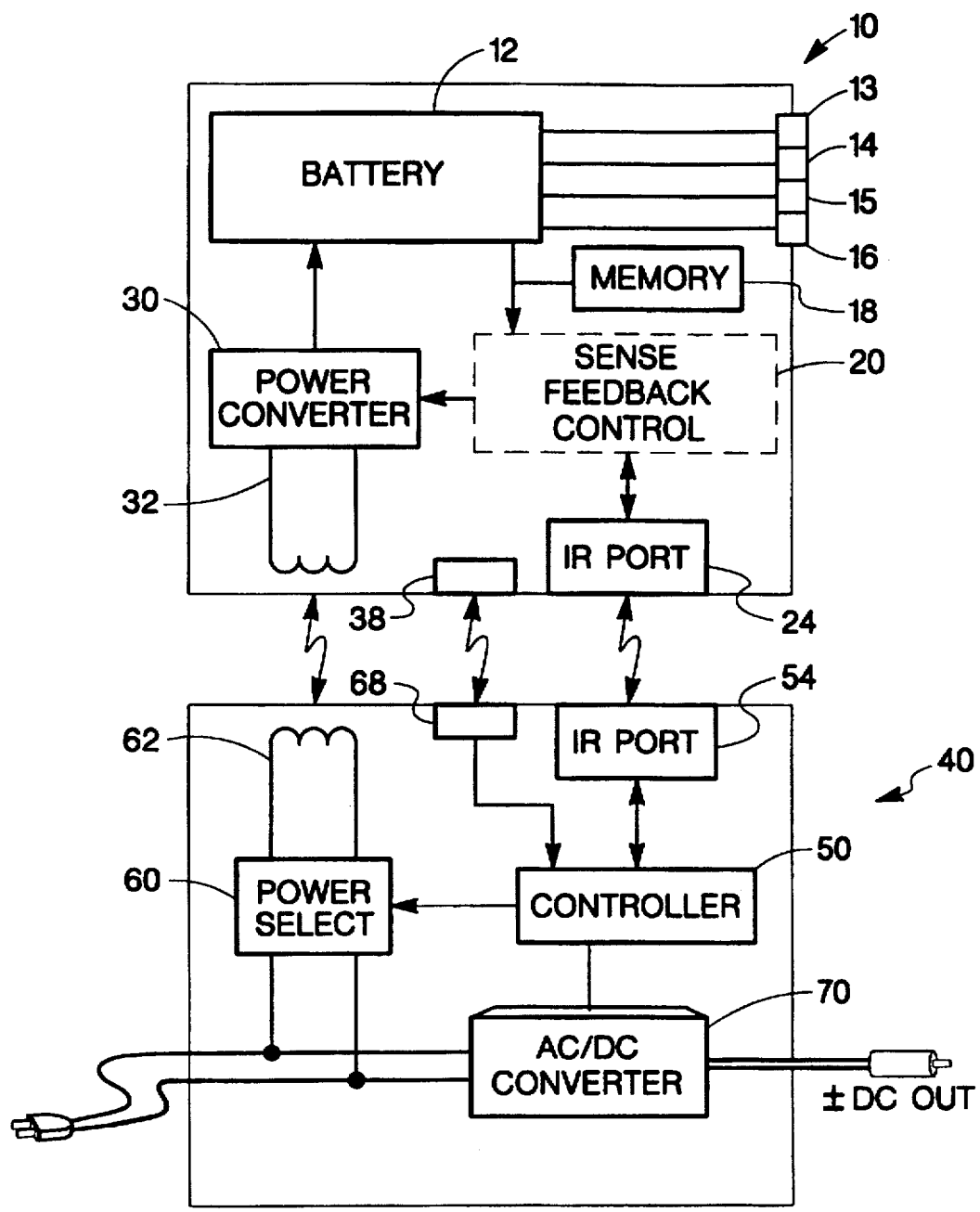
FIG. 1 is a block diagram of a battery pack and adapter in accordance with the present invention.

Referring to FIG. 1, a block diagram of a battery pack and adapter in accordance with the present invention is shown. The battery pack 10 is suitable for use in a portable electronic device such as a notebook computer, cellular telephones, and the like and includes a battery 12 having a plurality of surface electrodes 13-16. Electrode 13-14 for example, provide a supply and return voltage, while electrodes 15-16 provide serial data transfer. The content of this serial data may include battery status and sensing information such as charge status, voltage level, instantaneous current, and temperature, etc. A memory 18 may also be provided for accumulating a history of status and sensing information.

Battery 12 is preferably a lithium ion, N metal hydride or like battery. Both of these batteries are known in the art for their generally compact size and ability to hold extended charges. Lithium ion batteries are generally regarded as being lightweight. Battery 12 also contains sensors for collection of the type of data mentioned immediately above and such sensors are normally provided by the battery vendor.

During charging, as discussed in more detail below, lithium ion batteries are normally charged by a high power charge until a threshold voltage is reached, after which a lower power charge is applied. N metal hydride batteries are normally charged until a predefined temperature or rate of temperature change is reached, after which charging is more closely regulated.

Block 20 represents sensing, feedback and control logic. Block 20 is coupled to battery 12, a power converter 30 and a communication port 24. Block 20 is represented in dashed lines because the functions of the block can be, and in one preferred embodiment are, provided externally to the battery pack as discussed below.

The composition of the sensing logic which receives signals from the sensors will vary in a known manner depending on the type of battery used at battery 12. The output of the sensing logic provides feedback signals to the control logic which in turn regulates AC/DC power converter 30 by setting known parameters therein. For example, in the case of a lithium ion battery, after a threshold voltage across battery 12 is sensed, the control logic in block 20 (or block 50 of adapter 40 as discussed below) propagates control signals to the power converter 30. These control signals cause power converter 30 to reduce the rate at which the battery is being charged and to discontinue charging once a full charge is reached and sustained. In the case of a N metal hydride battery, a predetermined rate of change of battery temperature, when battery voltage is within a specified range, causes the control logic 20 (or 50 of adapter 40) to propagate similar control signals to power converter 30 to achieve a regulated reduction in charging level. The regulation of lithium ion and N metal hydride batteries is known in the art.

Power converter 30 is coupled to a secondary transformer winding 32 and to battery 12. The configuration of power converter 30 depends on the type of battery provided at battery 12, and may include voltage and drive level control, current limiting, decoupling relays and stepped or ramped voltage, amongst other known configurations. Charging specifications are provided by battery manufacturers.

The communication port 24 is preferably implemented as a wireless IR port (which is conventionally implemented with LEDs and photodetectors) though other wireless and wired techniques may be used and are included within the present invention. It should be recognized that the entire exterior housing of battery pack 10 or a subset thereof may be made of IR propagating media to eliminate communication alignment limitations.

Battery pack 10 also includes a proximity indicating device 38. The device 38 operates in conjunction with a proximity detector 68 in adapter 40 to indicate to the adapter that a battery pack is positioned for charging. Proximity indicating device 38 may be a magnet, while detector 68 is a magnetic sensor propagating a binary signal to controller 50. Additional proximity indicating devices may be provided within battery pack 10, for example, on the opposing surface, to further reduce alignment limitations.

Adapter 40 includes the controller 50 which is preferably an Intel 8051 or like processor. Controller 50 is coupled to a communication port (configured as an IR port) 54, proximity detector 68, a power selector 60 and an AC/DC converter 70. In one preferred embodiment of battery pack 10, the sensing, feedback and control logic of block 20 are provided in the controller 50. In this embodiment, sensed battery conditions are propagated from battery 12 through IR port 24 to controller 50 in adapter 40. The controller provides feedback control signals through the wireless communication ports 24,54 to power converter 30. Such a configuration, in which the control logic for battery pack 10 is provided external to the battery pack, achieves a basal level battery that has more universal application and is relatively inexpensive to manufacture.

Power selector 60 provides power amplification levels and may be configured to facilitate the voltage and current limiting properties discussed above for power converter 30. The output of power selector 60 is propagated to a primary transformer winding 62 (which forms a complete transformer with secondary transformer winding 32) from where it is inductively coupled to secondary transformer winding 32 in battery pack 10.

AC/DC converter 70 is preferably designed to receive an input AC signal ranging from 90–260 V and to produce a regulated output consisting of a positive voltage and corresponding negative return voltage. In one preferred embodiment for use with a conventional notebook computer, such as those of Hewlett-Packard Company, the output voltage is preferably 12 V DC.

Figure 2:
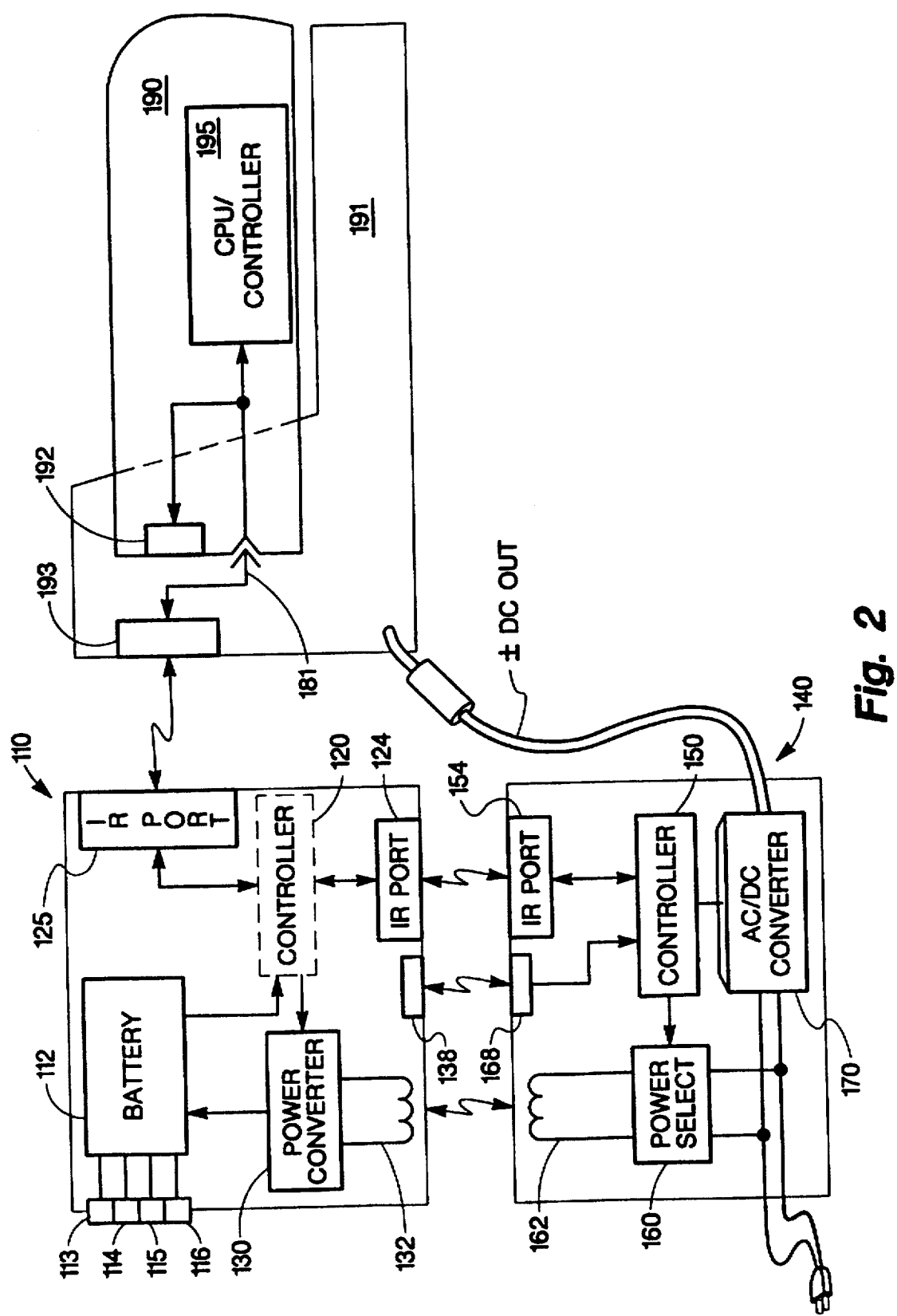
FIG. 2 is a block diagram of a battery pack and charging system in accordance with the present invention.

Referring to FIG. 2, a block diagram of a battery pack and charging system in accordance with the present invention is shown. This system provides simultaneous charging of a battery pack and portable electronic device.

Battery pack 110 is similar to battery pack 10 of FIG. 1 in that it includes a battery 112 coupled to external electrodes 113–116, a power converter 130, optional control logic 120, a proximity indicating device 138 and a communication port 124. Battery pack 110 also includes a second communication port 125. Both of these ports 124,125 are preferably configured as wireless IR ports. Port 125 permits communication with a like port of a portable computing device 190 or a docking station 191 for such a portable computing device. At least one of the computing device and docking station provides a wireless communication port 192 or 193 to achieve communication with battery pack 110. The communication port may be configured in the docking station and propagate signals via conductor 181 or be provided directly in the portable computing device 190 (with the docking station being configured so as to not obstruct communication between the device 190 and battery pack 110.

The establishment of communication between a portable computing device 190 and a battery pack to-be-charged permits utilization of the processor 195 for control of charging and thus eliminates the need for same in control block 120 or 150. To achieve requisite control with processor 195, the processor is configured to receive sensed signals from battery 112 (output through port 125) and to generate power converter 130 control signals based on the sensed signals. The control signals are propagated directly to power converter 130 (i.e., block 120 merely act as a pass through for sensing and control signals). When battery 112 is fully charged, the processor disables power converter 130 and communicates through port 124 to the adapter 140 to disable its charging function. Though use of processor 195 may achieve some advantages, retaining control logic in block 50 is advantageous in that it permits charging of a battery pack when a portable computing device (and the processor therein) are not available.

The adapter 140 is analogous to adapter 40 of FIG. 1 and includes a primary transformer 162, a power selector 160, an AC/DC converter 170, a communication port 154 and a proximity detector 168. A DC output of adapter 140 (and 40 of FIG. 1) may be used to power a portable computing device coupled to a DC output port.

Figure 3:
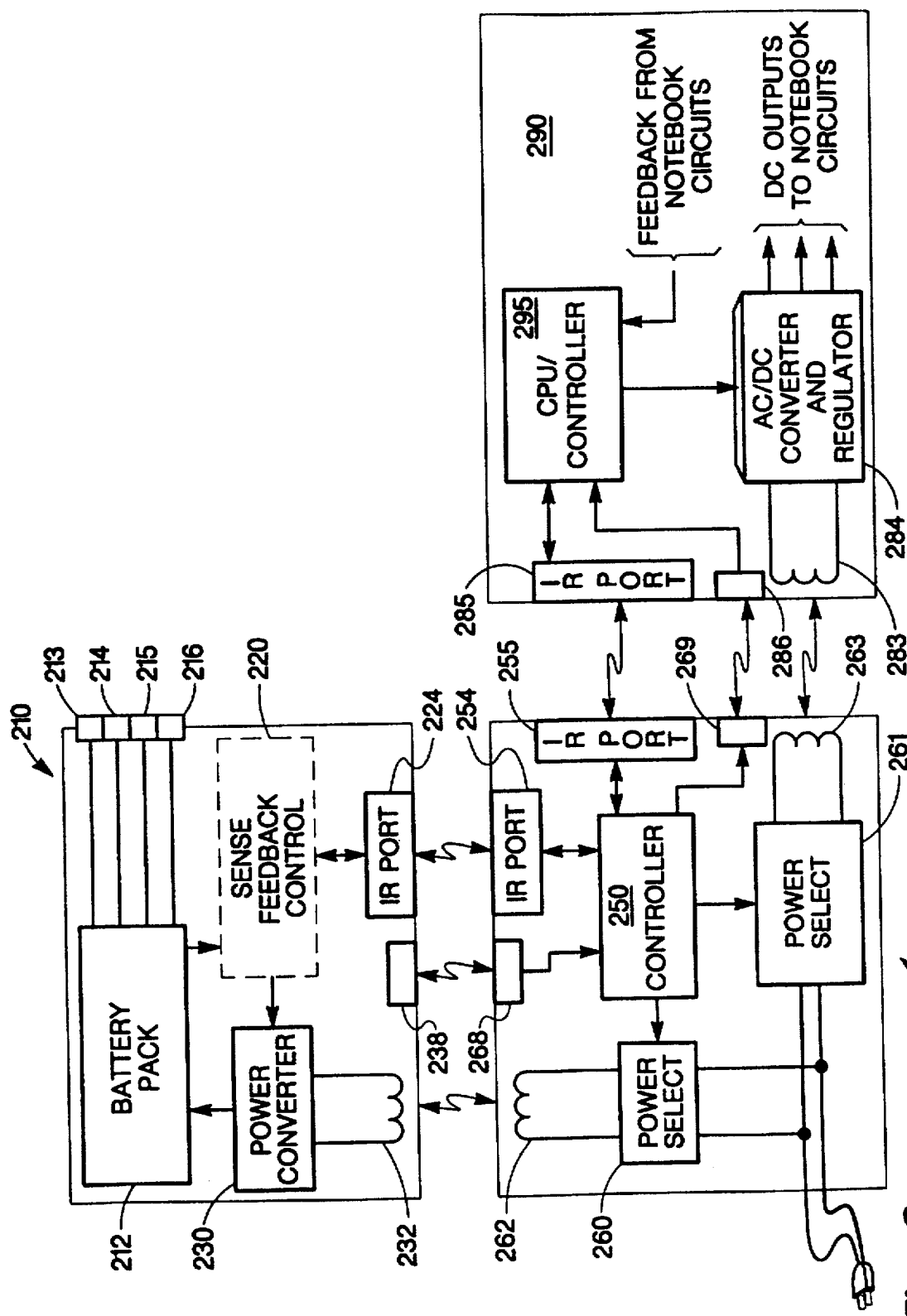
FIG. 3 is a block diagram of another battery pack and charging system in accordance with the present invention.

Referring to FIG. 3, a block diagram of another battery pack and charging system in accordance with the present invention is shown.

Adapter unit 240 provides wireless charging of a battery pack 210 and a portable computing device 290. To provide this feature, adapter 240 includes first and second power selectors 260,261 and first and second primary transformers windings 262,263. Primary transformer winding 263 couples electrical energy to secondary transformer winding 283 for powering the portable computing device and for charging a battery therein. An AC/DC converter-regulator 284 converts the input AC power signal to DC for use by portable computing device circuits, including a known battery charging circuit. Feedback from these circuits is utilized by the processor 295 to control the charge output from AC/DC converter 284 in a manner discussed above for power converter 30 of FIG. 1. Portable computing device 290 also includes a proximity detector 286 and a communication port 285.

Adapter 240 includes a proximity detector 268, proximity indicating device 269 and two wireless communication ports 254,255 for communicating with the battery pack 210 and portable computing device 290, respectively. These components are as discussed above with reference to FIG. 1. Block 250 represents control logic for charging a battery pack (as discussed above for controller 50) and battery pack 210 is analogous to battery pack 10.

It should be recognized that adapter 240 could be used to charge two battery packs, instead of one battery pack and one portable electronic device. In this instance, adapter 240 would be provided with a second proximity detector for detecting the presence of the second battery pack and known control logic in block 250 for regulating charging of the second battery pack.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A battery pack for use with a portable electronic device, comprising:

a housing;

a battery mounted within said housing;

a secondary transformer winding mounted within said housing for coupling an AC power signal;

power converting means coupled between said battery and said secondary transformer winding for converting an AC power signal coupled by said secondary transformer winding into a DC power signal for charging said battery;

a first communication port formed in an exterior of said housing; and means coupled to said battery and said first communication port for propagating signals indicative of battery charge status from said battery to said first communication port, said signals indicating at least the need for charging at a first level and a second level different from said first level, and for propagating the status signals outside of said battery pack.

2. The battery pack of claim 1, further comprising a proximity indicating device.

3. The battery pack of claim 1, wherein said first communication port is an IR port.

4. The battery pack of claim 1, further comprising a second communication port.

5. An AC adapter for use in charging a battery of the type used in a portable electronic device, comprising:

a housing;

a first primary transformer winding mounted within said housing for emitting an AC power signal outside of said housing;

power selecting means coupled between said primary transformer winding and an AC input for selecting a level of power emitted from said primary transformer winding;

a communication port for receiving battery status signals from a battery pack in the proximity of said adapter that indicates at least the need for charging at a first level and a second level; and control logic means coupled to said communication port and said power selecting means for generating control signals that control the charging of a battery pack in the proximity of said adapter.

6. The adapter of claim 5, wherein said control signals are propagated through an IR port to an exterior of said adapter to regulate a power converter of said battery pack in the proximity of said adapter.

7. The adapter of claim 5, further comprising proximity detecting means for detecting the presence of a proximity indicating device within a predefined proximity of said adapter.

8. The adapter of claim 5, further comprising:

an AC/DC converter coupled to said AC input for converting an AC power signal to a DC power signal; and output port means for coupling said DC signal exterior of said adapter.

9. The adapter of claim 5, further comprising:

a second primary transformer winding mounted within said housing for emitting a second AC power signal outside of said housing; and second power selecting means coupled between said second primary transformer winding and said AC input for selecting a level of power emitted from said second primary transformer winding.

10. A battery pack for use with a portable electronic device, comprising:

a housing;

a battery mounted within said housing;

a secondary transformer winding mounted within said housing for coupling an AC power signal;

power converting means coupled between said battery and said secondary transformer winding for converting an AC power signal coupled by said secondary transformer winding into a DC power signal for charging said battery;

a first communication port formed in an exterior of said housing;

means coupled to said battery and said first communication port for propagating signals indicative of battery charge status from said battery to said first communication and for propagating the status signals outside of said battery pack; and feedback control means coupled between said battery and said power converting means for controlling an output of said power converting means based on sensed battery status signals input from said battery.

11. A battery pack for use with a portable electronic device, comprising:

a housing;

a battery mounted within said housing;

a secondary transformer winding mounted within said housing for coupling an AC power signal;

power converting means coupled between said battery and said secondary transformer winding for converting an AC power signal coupled by said secondary transformer winding into a DC power signal for charging said battery;

a first communication port formed in an exterior of said housing; and means coupled to said battery and said first communication port for propagating signals indicative of battery charge status from said battery to said first communication and for propagating the status signals outside of said battery pack;

wherein said power converting means is coupled to said communication port in such a manner as to receive power converting means control signals via the communication port that control the DC power output to the battery.

12. A battery charging system, comprising:

a battery pack containing a battery;

an adapter;

portable electronic device, separate from said battery pack; and a communication link between said battery pack and said portable computing device for propagating battery status information to said portable electronic device;

wherein said adapter comprises means for simultaneously charging said battery and said portable electronic device.

* * * * *